(12) United States Patent
Iimori

(10) Patent No.: US 6,925,429 B2
(45) Date of Patent: Aug. 2, 2005

(54) ELECTRIC WIRING SIMULATION DEVICE AND RECORDING MEDIUM RECORDING SIMULATION PROGRAM FOR ELECTRIC WIRING SIMULATION DEVICE

(75) Inventor: Yasuo Iimori, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 708 days.

(21) Appl. No.: 09/897,499

(22) Filed: Jul. 3, 2001

(65) Prior Publication Data

US 2002/0004715 A1 Jan. 10, 2002

(30) Foreign Application Priority Data

Jul. 4, 2000 (JP) .................................... P 2000-202232

(51) Int. Cl.$^7$ .......................... G06F 17/50; G01R 15/00; G01R 25/00
(52) U.S. Cl. ............................ 703/14; 703/18; 702/58; 702/65; 702/118
(58) Field of Search ................................ 703/2, 13, 14, 703/18, 6, 8; 702/57, 58, 59, 60, 64, 65, 118–121; 324/415–424; 716/3, 4; 345/763, 771, 840, 781; 434/224; 700/95–97

(56) References Cited

U.S. PATENT DOCUMENTS

| | | | | | |
|---|---|---|---|---|---|
| 3,808,409 A | * | 4/1974 | Enns et al. | ..................... | 703/3 |
| 3,930,307 A | * | 1/1976 | Schotthoefer et al. | ......... | 29/593 |
| 4,182,959 A | * | 1/1980 | MacCleary et al. | ...... | 250/492.1 |
| 4,245,318 A | * | 1/1981 | Eckart et al. | ................. | 702/67 |
| 4,316,720 A | * | 2/1982 | Ackerman | ................... | 434/224 |
| 4,464,120 A | * | 8/1984 | Jensen | ......................... | 434/224 |
| 4,613,952 A | * | 9/1986 | McClanahan | ................... | 703/6 |
| 5,452,223 A | * | 9/1995 | Zuercher et al. | .............. | 702/58 |
| 5,548,539 A | * | 8/1996 | Vlach et al. | .................... | 703/6 |
| 5,592,614 A | * | 1/1997 | Peters | ......................... | 714/26 |
| 5,644,238 A | * | 7/1997 | Seifert et al. | ................ | 324/424 |
| 5,872,722 A | * | 2/1999 | Oravetz et al. | ............. | 345/764 |
| 5,946,210 A | * | 8/1999 | Montminy et al. | ........... | 700/97 |
| 6,003,012 A | * | 12/1999 | Nick | .......................... | 700/95 |
| 6,009,406 A | * | 12/1999 | Nick | .......................... | 700/95 |
| 6,088,205 A | * | 7/2000 | Neiger et al. | ................. | 361/42 |
| 6,385,565 B1 | * | 5/2002 | Anderson et al. | ............ | 703/18 |
| 6,606,731 B1 | * | 8/2003 | Baum et al. | ................... | 716/3 |
| 6,618,856 B2 | * | 9/2003 | Coburn et al. | ............... | 703/15 |
| 6,629,044 B1 | * | 9/2003 | Papallo et al. | ............... | 702/60 |
| 6,658,312 B1 | * | 12/2003 | Hagiyama | .................... | 700/95 |

OTHER PUBLICATIONS

Jergovic, Protection and Fusing in Advanced Automotive Electrical Environment, LEES Technical Report TR–00–002, Apr. 10, 2000.*
Hunt, Model–based Design Analysis, Jan. 21, 2000.*
Price, AutoSteve:Automated Electrical Design Analysis, PAIS–2000.*

* cited by examiner

Primary Examiner—Russell Frejd
(74) Attorney, Agent, or Firm—Finnegan, Henderson, Farabow, Garrett, Dunner, L.L.P.

(57) ABSTRACT

An electric wiring simulation device 1 of the present invention includes an input device 2; a display 5; a characteristics information data base 4 storing parts information on parts and wirings, discharge characteristics of a power supply, current-prearcing time characteristics of protecting parts and current-smoke time characteristics of the wirings; an assigned path searching unit 11 searching an assigned path between a short-circuit point and the power supply on a test object circuit; a current value calculating unit 12 calculating a resistance value on the assigned path based on the parts information, and calculating a short-circuit value based on the resistance value and the discharge characteristics of the power supply; and a judging unit 13 judging whether or nor each protecting part is fused or etch wiring smokes based on the current-smoke time characteristics and the current-prearcing time characteristics, at unit time intervals.

6 Claims, 14 Drawing Sheets

FIG.6

INPUT OF PARTS INFORMATION

PART NAME
FL-001

TYPE
30 : A
30 : A
30 : B
40 : A
40 : B
50 : A
50 : B
60 : A
60 : B

OK 01 mm

LAMP1

FIG.7

INPUT OF WIRE DATA

LENGTH  500  mm

SIZE  0.85  sq

WIRE HARNESS NAME  WIRE01

CIRCUIT CODE  B002

OK  CANCEL

FIG. 11

MAINTENANCE OF PARTS DATA

| ID | TYPE | NAME | DISPLAY | CURRENT CAPACITY | CODE | INITIAL RESISTANCE VALUE | A |
|---|---|---|---|---|---|---|---|
| 1 | 30:A | F/L 30-A | 30-A | 30 | A | 0.0056 | 0.03 |
| 2 | 30:B | F/L 30-B | 30-B | 30 | B | 0.0052 | 0.03 |
| 3 | 40:A | F/L 40-A | 40-A | 40 | A | 0.0045 | 0.02 |
| 4 | 40:B | F/L 40-B | 40-B | 40 | B | 0.0042 | 0.02 |
| 5 | 50:A | F/L 50-A | 50-A | 50 | A | 0.003 | 0.01 |
| 6 | 50:B | F/L 50-B | 50-B | 50 | B | 0.00275 | 0.01 |
| 7 | 60:A | F/L 60-A | 60-A | 60 | A | 0.00275 | 0.01 |
| 8 | 60:B | F/L 60-B | 60-B | 60 | B | 0.00235 | 0.01 |
| 9 | 80:B | F/L 80-B | 80-B | 80 | B | 0.00213 | 0.00 |
| 10 | 100:B | F/L 100-B | 100-B | 100 | B | 0.0013 | 0.00 |
| 11 | FLW 0.3SQ | FLW 0.3SQ | W 0.3 | 20 | C | 0.0054 | 0.01 |
| 12 | FLWX 0.5SQ | FLWX 0.5SQ | WX 0.5 | 30 | C | 0.00301 | 0.01 |
| 13 | FLWX 0.85SQ | FLWX 0.85SQ | WX 0.85 | 40 | C | 0.00191 | 0.00 |
| 14 | FLWX 1.0SQ | FLWX 1.0SQ | WX 1.0 | 50 | C | 0.00162 | 0.00 |
| 15 | FLWX 1.25SQ | FLWX 1.25SQ | WX 1.25 | 60 | C | 0.00132 | 0.00 |

END

FIG.16A

| No. | Protecting Part Name | Current Capacity (A) | Circuit Number | Load Circuit Name | Minimum Size of a Wire (mm²) | Review of Wiring Protection Characteristics ||| Short-circuit Test Results |||
|---|---|---|---|---|---|---|---|---|---|---|---|
| | | | | | | Matching Judgment || Current Capacity of a Fuse (A) | Short-circuit Current (A) | Prearcing Time (S) | Judgment |
| | | | | | | Matching Between Minimum Size of a Wire And Current Capacity of a Fuse | | | | | |
| | AM2 | 15 | (5) | N/ST SW | 0.5 | △ | | 15 | 63~60 | Prearc | ○ |
| | DOME | 15 | (6) | DOME LP | 0.5 | △ | | 15 | 45~45 | Prearc | ○ |
| | EFI | 15 | (4) | EFI ECU | 1.25 | ○ | | 15 | 143~142 | Prearc | ○ |
| | HORN | 10 | (3) | HORN RH | 0.5 | ○ | | 10 | 97~97 | Smoke | × |
| | ABS | 60 | (1) | ABS ECU | 3 | × | | 60 | 567~667 | Prearc | ○ |
| | | | (2) | ABS ECU | 3 | × | | 60 | 567~667 | Prearc | ○ |
| | RDI FAN | 30 | (7) | RDI FAN MTR | 2 | △ | | 30 | 249~253 | Prearc | ○ |
| | STI | 30 | (8) | STARTER | 2 | △ | | 30 | 243~233 | Prearc | ○ |
| | HTR | 40 | (9) | A/C SUB | 3 | △ | | 40 | 273~273 | Prearc | ○ |
| | ECU-B | 7.5 | (11) | RP FOG SW | 0.5 | ○ | | 7.5 | 243~243 | Smoke | × |
| | A/C | 7.5 | (10) | A/C SW | 0.5 | ○ | | 7.5 | 137~137 | Smoke | × |
| | FR FOG | 15 | (17) | FR FOG LP LH | 2 | ○ | | 15 | 90~90 | Smoke | × |
| | PWR | 30 | (18) | P/W SW RR | 0.5 | △ | | 30 | 179~177 | Prearc | ○ |
| | STOP | 10 | (19) | STOP LP SW | 0.5 | ○ | | 10 | 281~281 | Smoke | × |
| | TAIL | 7.5 | (20) | L/CTRL SW | 0.3 | ○ | | 7.5 | 171~171 | Smoke | × |
| | HAZ | 10 | (21) | RR TURN LH | 0.3 | △ | | 10 | 46~46 | Prearc | ○ |
| | ECU-IG | 7.5 | (12) | G SSR | 0.3 | ○ | | 7.5 | 66~58 | Prearc | ○ |
| | GAUGE | 10 | (13) | BK/UP LP SW | 0.3 | △ | | 10 | 65~60 | Prearc | ○ |
| | WIP | 20 | (14) | RR WIP MTR | 0.85 | △ | | 20 | 75~74 | Prearc | ○ |
| | ACC | 15 | (15) | RADIO | 0.5 | △ | | 15 | 135~135 | Smoke | × |
| | DEF | 20 | (16) | DEF SW | 1.25 | ○ | | 20 | 181~175 | Prearc | ○ |

ELECTRIC WIRING SIMULATION DEVICE AND RECORDING MEDIUM RECORDING SIMULATION PROGRAM FOR ELECTRIC WIRING SIMULATION DEVICE

BACKGROUND OF THE INVENTION

1. Field of the Invention

The present invention relates to an electric wiring simulation device for simulating the characteristics of an electric wiring when the wiring is short-circuited. The present invention particularly relates to an electric wiring simulation device capable of making a simulation as to whether or not the protecting part of an electric wiring is fused and whether or not the wiring smokes and a recording medium recording a simulation program for the electric wiring simulation device.

2. Description of the Related Art

To simulate the circuit characteristics of a semiconductor integrated circuit, there is conventionally proposed a simulation method (Japanese Patent Application Laid-Open No. 8-327698) capable of more accurately obtaining current and voltage in view of the self-heating of circuit elements. This method does not, however, simulate the characteristics of an electric wiring such as a wire harness when the wiring is short-circuited.

To conduct a characteristics test while the electric wiring is short-circuited, therefore, a wire harness is actually formed as a sample and the sample wire harness is actually short-circuited.

The conventional wire harness characteristics test will be described based on FIG. 1. In the conventional wire harness characteristics test, a wire harness 101 serving as a test sample is connected to the positive terminal of a battery 102 serving as a power supply and a load terminal 103 which becomes a short-circuited region is connected to the negative terminal of the battery 102 through a knife switch 104.

Then, the knife switch 104 is turned on to short-circuit a circuit, a short-circuit current value at this time is obtained by a clamp ammeter 105 and measured by a memory HiCoder 106. Time taken for a protecting pat 107 such as a fuse to be fused is also measured.

According to a conventional test, a wire harness serving as a sample is actually formed, actually short-circuited and a test is conducted to judge whether or not the protecting part is normally operated and fused or whether or not the wire harness smokes.

However, a characteristics test conducted using the above-described sample wire harness cannot be conducted unless the sample wire harness is actually formed, so that a timely test cannot be disadvantageously conducted. Furthermore, if a test is conducted while the sample wire harness is short-circuited, not only the sample wire harness but also other parts such as a battery and respective switches are necessary, whereby cost for testing material is disadvantageously pushed up.

SUMMARY OF THE INVENTION

The present invention has been made under the above-described circumstances. It is, therefore, an object of the present invention to provide an electric wiring simulation device capable of making a simulation as to whether or not the protecting part of an electric wiring is fused and whether or not the wiring smokes and to provide a recording medium for recording a simulation program for the electric wiring simulation device.

The first aspect of the invention provides an electric wiring simulation device simulating characteristics of an electric wiring while the electric wiring is short-circuited, comprising: a characteristics information data base for storing parts information on parts and wirings constituting a test object circuit, discharge characteristics of a power supply, current-prearcing time characteristic of protecting parts and current-smoke time characteristics of the wirings; an assigned path searching unit for searching an assigned path between a short-circuit point and the power supply when the short-circuit point on the test object circuit is assigned; a current value calculating unit for calculating a resistance value on the assigned path searched by the assigned path searching unit, and calculating a short-circuit current value based on the resistance value and the discharge characteristics of the power supply; and a judging unit for judging whether each protecting pair on the test object circuit is fused and whether each wiring of the assigned path smokes based on the short-circuit current value calculated by the current value calculating unit, the current-smoke time characteristics and the current-prearcing time characteristics at unit time interval.

According to the first aspect of the invention, it is possible to make a simulation as to whether or not the protecting part of an electric wiring is fused and whether or not the electric wiring smokes.

The second aspect of the invention provides an electric wiring simulation device according to the first aspect of the invention, wherein the current value calculating unit takes account of the resistance value during heat emission based on a change in the resistance values with respect to time, the resistance values included in the parts information.

According to the second aspect of the invention, it is possible to make a simulation in view of changes in resistance values due to the heating of respective parts and respective wirings.

The third aspect of the invention provides a recording medium for recording a simulation program for an electric wiring simulation device simulating characteristics of an electric wiring while the electric wiring is short-circuited, the simulation program recorded on the recording medium comprising: a storage process for storing parts information on parts and wirings constituting a test object circuit inputted as a simulation object, discharge characteristics of a power supply, current-prearcing time characteristics of protecting parts and current-smoking time characteristics of the wirings, in a data base; an assigned path searching process for searching an assigned path between a short-circuit point and the power supply when the short-circuit point is assigned on the test object circuit; a current value calculating process for calculating a resistance value on the assigned path searched in the assigned path searching processing, and for calculating a short-circuit current value based on the resistance value and the discharge characteristics of the power supply; and a judging process for judging whether each protecting part on the assigned path is fused and whether each wiring on the assigned path smokes based on the short-circuit current value calculated in the current value calculating processing, the current-smoke time characteristics and the current-prearcing time characteristics, at unit time intervals.

According to the third aspect of the invention, it is possible to make a simulation as to whether or not the protecting part of an electric wiring is fused and whether or not the electric wiring smokes.

The fourth aspect of the invention provides a recording medium for recording a simulation program for an electric wiring simulation device simulating characteristics of an electric wiring according to the third aspect of the invention, wherein the current value calculating process is conducted while taking account of the resistance value during heat emission based on a change in the resistance values with respect to time, the resistance values included in the parts information.

According to the fourth aspect of the invention, it is possible to make a simulation in view of changes in resistance values due to the heating of respective parts and respective wirings.

The fifth aspect of the invention provides a simulation program for an electric wiring simulation device simulating characteristics of an electric wiring while the electric wiring is short-circuited, the simulation program comprising: a storage code segment for storing parts information on parts and wirings constituting a test object circuit inputted as a simulation object, discharge characteristics of a power supply, current-prearcing time characteristics of protecting parts and current-smoking time characteristics of the wirings, in a data base; an assigned path searching code segment for searching an assigned path between a short-circuit point and the power supply when the short-circuit point is assigned on the test object circuit; a current value calculating code segment for calculating a resistance value on the assigned path searched in the assigned path searching code segment, and for calculating a short-circuit current value based on the resistance value and the discharge characteristics of the power supply; and a judging code segment for judging whether each protecting part on the assigned path is fused and whether each wiring on the assigned path smokes based on the short-circuit current value calculated in the current value calculating code segment, the current-smoke time characteristics and the current-prearcing time characteristics, at unit time intervals.

According to the fifth aspect of the invention, it is possible to make a simulation as to whether or not the protecting part of an electric wiring is fused and whether or not the electric wiring smokes.

The sixth aspect of the invention provides a simulation program for an electric wiring simulation device simulating characteristics of an electric wiring while the electric wiring is short-circuited according to the fifth aspect of the invention, wherein the current value calculating code segment is conducted while taking account of the resistance value during heat emission based on a change in the resistance values with respect to time, the resistance values included in the parts information.

According to the sixth aspect of the invention, it is possible to make a simulation in view of changes in resistance values due to the heating of respective parts and respective wirings.

BRIEF DESCRIPTION OF THE DRAWINGS

FIG. 6 shows one example of a parts information input screen for the electric wiring simulation device 1 shown in FIG. 2;

FIG. 7 shows one example of a wire data input screen for the electric wiring simulation device 1 shown in FIG. 2;

FIG. 11 shows one example of parts information stored in a characteristics information data base 4 shown in FIG. 2;

DETAILED DESCRIPTION OF THE PREFERRED EMBODIMENTS

Hereinafter, the embodiments of an electric wiring simulation device and a recording medium recording a simulation program for the electric wiring simulation device according to the present invention will be described with reference to the drawings.

Figure 1:
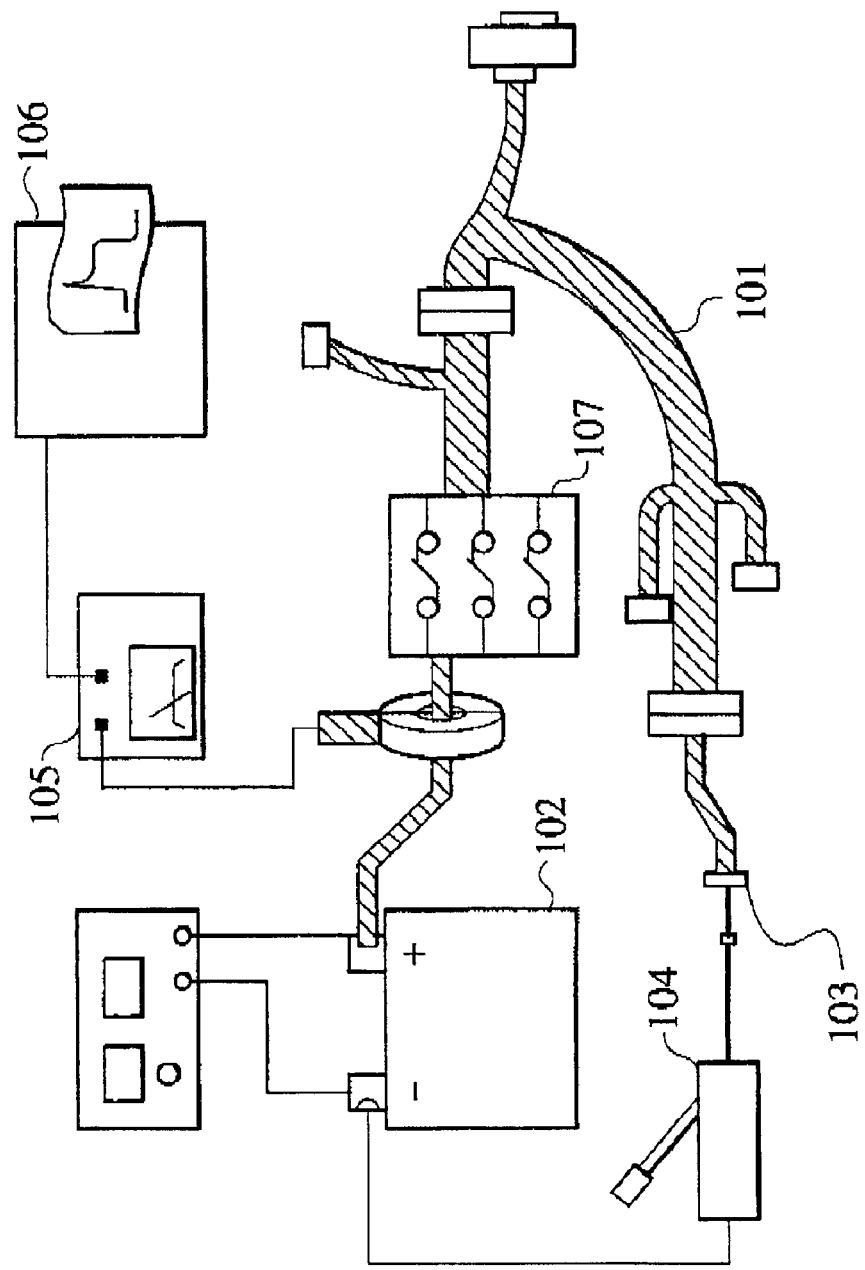
FIG. 1 is an explanatory view for a conventional wire harness short-circuit test.
Figure 2:
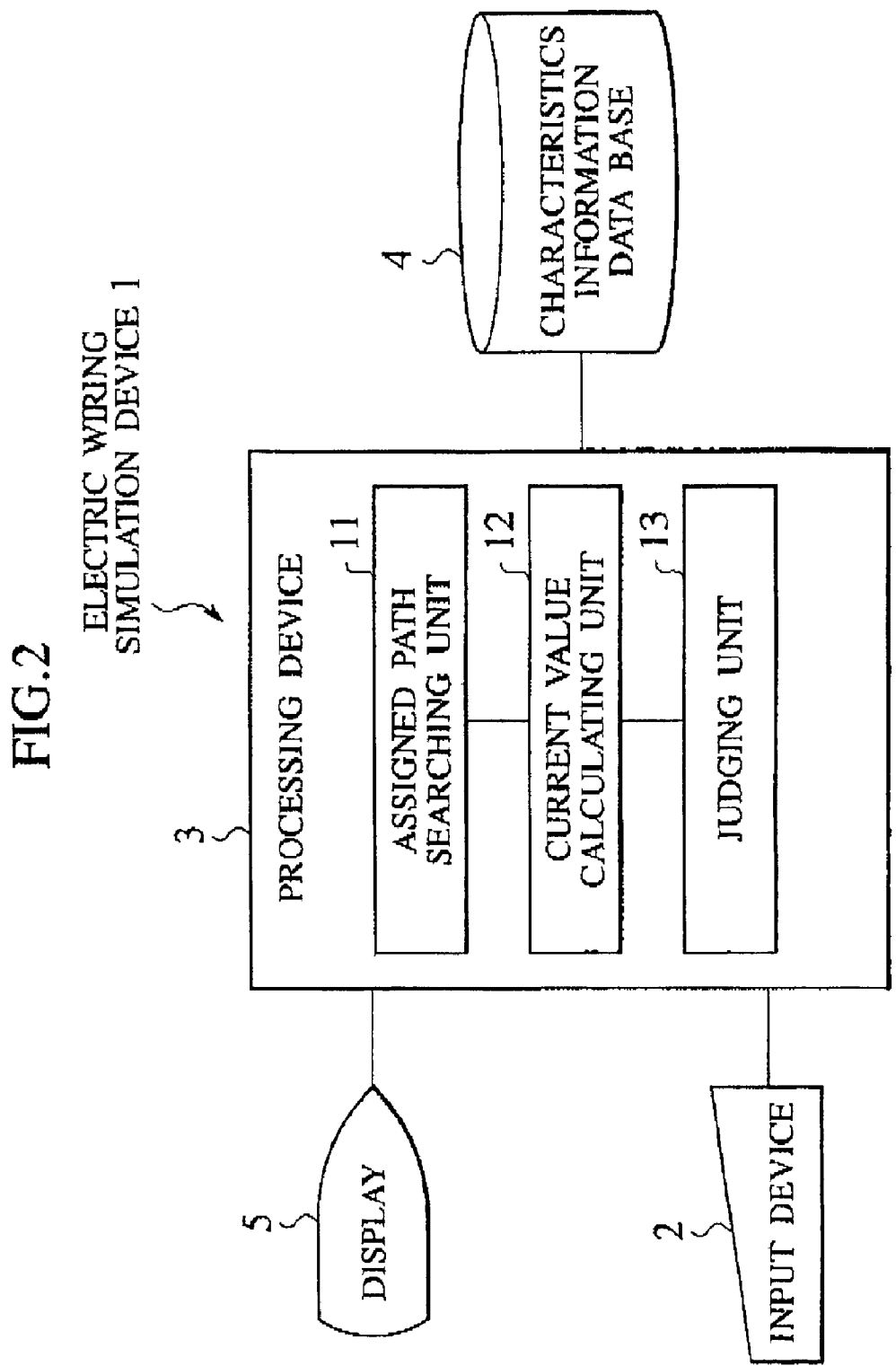
FIG. 2 is a block diagram showing the constitution of one embodiment of an electric wiring simulation device according to the present invention.

As shown in FIG. 2, the electric wiring simulation device 1 in this embodiment comprising an input device 2 inputting instructions from an operator responsible for an electric wiring simulation, a processing device 3 executing electric wiring simulation processes a characteristics information data base 4 storing information on respective parts and wirings necessary for the simulation processes, and a display 5 outputting simulation input screens and simulation results.

The processing device 3 includes an assigned path searching unit 11 searching an assigned path between a short-circuit point on a test object circuit inputted as a simulation object and a power supply when the operator assigns this short-circuit point, a current value calculating unit 12 calculating a resistance value on the searched assigned path, and calculating a short-circuit current value based on this resistance value and the discharge characteristics of the power supply, and a judging unit 13 judging whether or not each protecting part on the assigned path is fused and each wiring on the assigned path smokes based on this short-circuit resistance value, current-smoke time characteristics and current-prearcing time characteristics at unit time intervals. The processing device 3 is constituted by an ordinary computer system including a CPU for conducting various processes and a storage unit storing instructions for the respective processes. The instructions and timing restrictions for the respective processes conducted by the processing device 3 are held by the storage unit and loaded to and executed by the CPU as required.

The characteristics information data base 4 stores parts information on parts and wirings constituting the test object circuit, the discharge characteristics of the power supply such as a buttery, the current-prearcing time characteristics of the protecting parts such as a fuse and a fusible link and the current-smoke time characteristics of the respective wirings.

Figure 3:
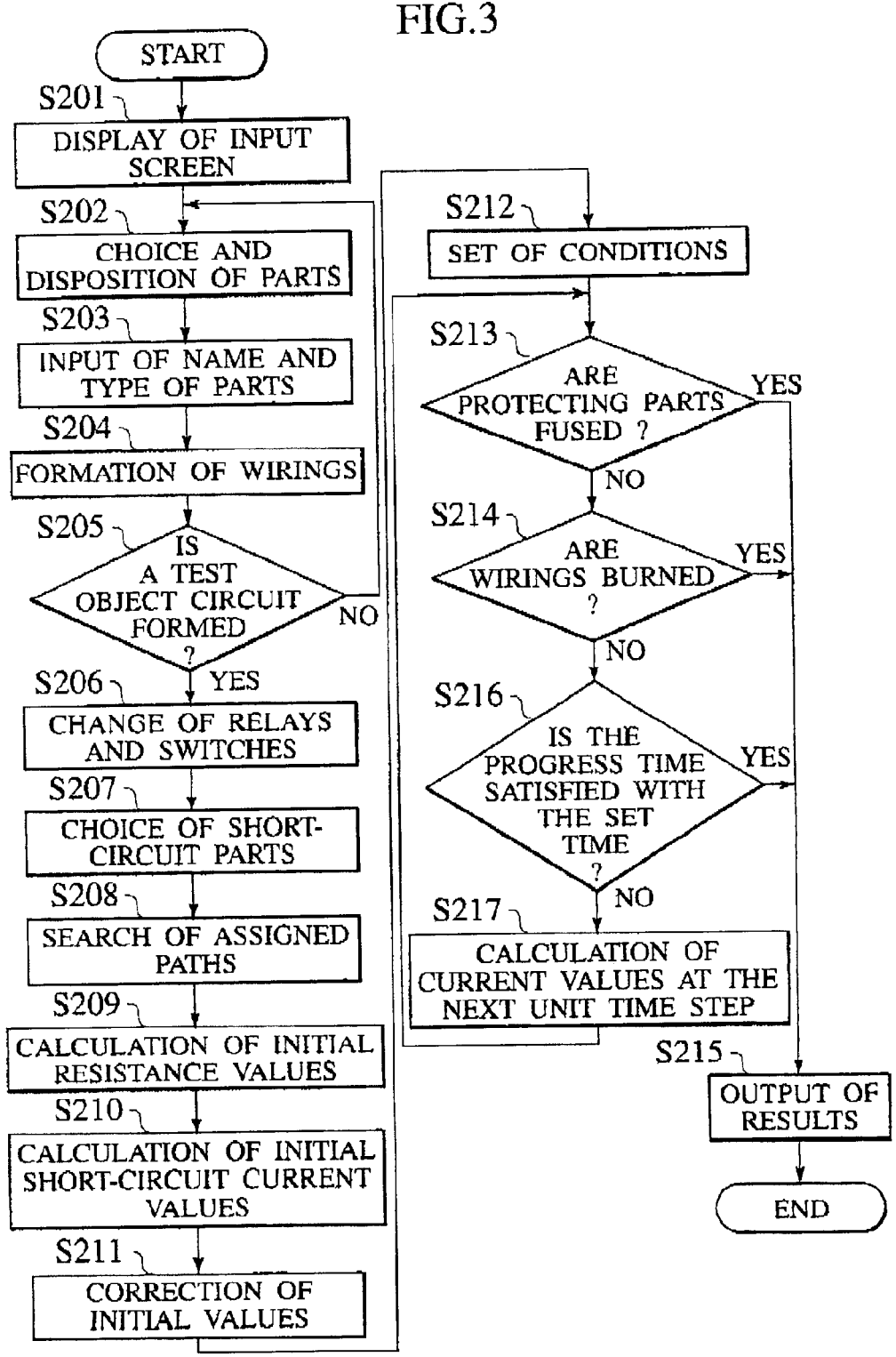
FIG. 3 is a flow chart for describing simulation process for the electric wiring simulation device 1 shown in FIG. 2.

A simulation process conducted by the electric wiring simulation device will be described based on the flow chart of FIG. 3.

Figure 4:
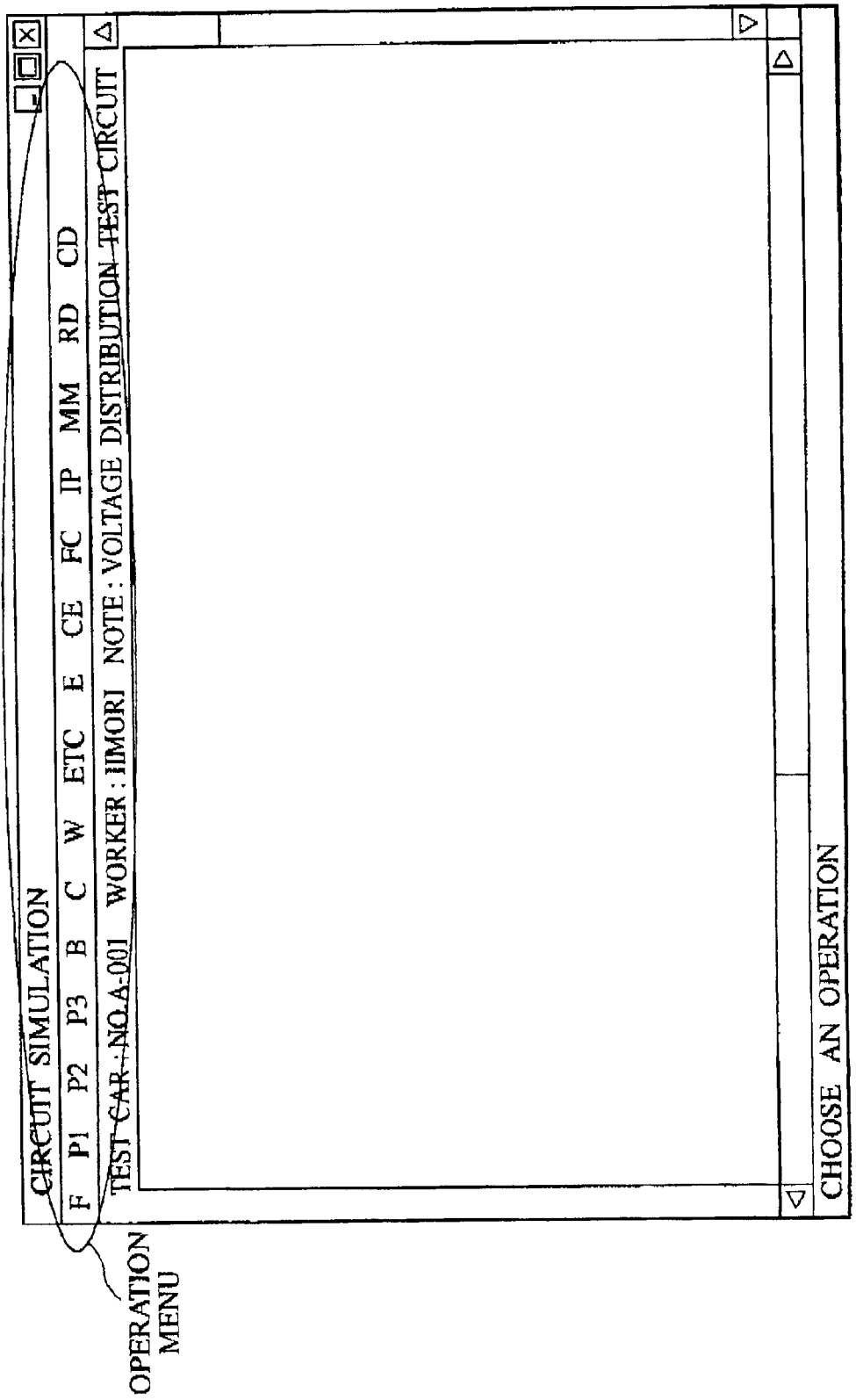
FIG. 4 shows one example of an input screen for the electric wiring simulation device 1 shown in FIG. 2.

When a simulation process starts, an input screen showing an operation menu is displayed on the display 5 as shown in FIG. 4 (in a step S201). The operation menu includes File (F), Part (P), circuit Bifurcation (B) and circuit Confluence (C), Wire (W), ET Cetera (ETC), Edition (E), Comprehensive Edition (CE) Function (FC), Image Processing (IP), Master Maintenance (MM), Reduced-size Display (RD) and Characteristics Display (CD).

Figure 5:
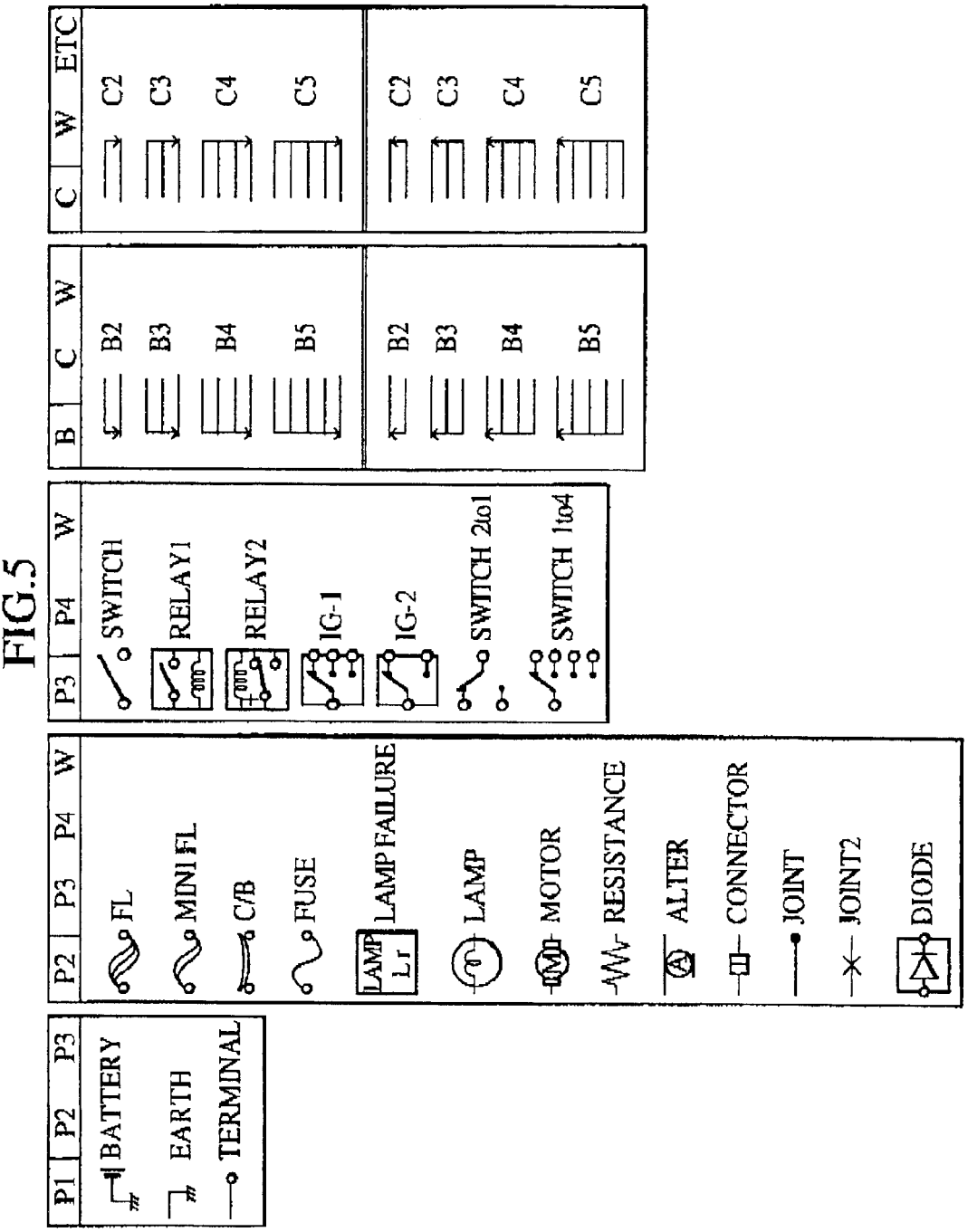
FIG. 5 shows one example of a part select screen for the electric wiring simulation device 1 shown in FIG. 2.

An operator chooses parts used in a test object circuit and inputs the disposition of the parts so as to form the test calculation object (in a step S202). To choose parts, P1, P2, P3 and the like are clicked on the operation menu on the input screen and parts are chosen from a select window shown in FIG. 5. The positions at which the parts are disposed are inputted by clicking on the positions on the input screen.

If the parts and the disposed positions thereof are determined as described above, a select window for the part name and type of each part is displayed as shown in FIG. 6 and the part name and type thereof are inputted (in a step S203).

Wirings are formed by clicking on 'W' on the operation menu on the input screen and the parts are connected by the wirings (in a step S204). Battery-side parts are clicked on from among the parts to be connected and then earth-side parts are clicked on. Then, the length, size, wire harness name and circuit code of each wire are inputted on a wire data input window shown in FIG. 7.

Figure 8:
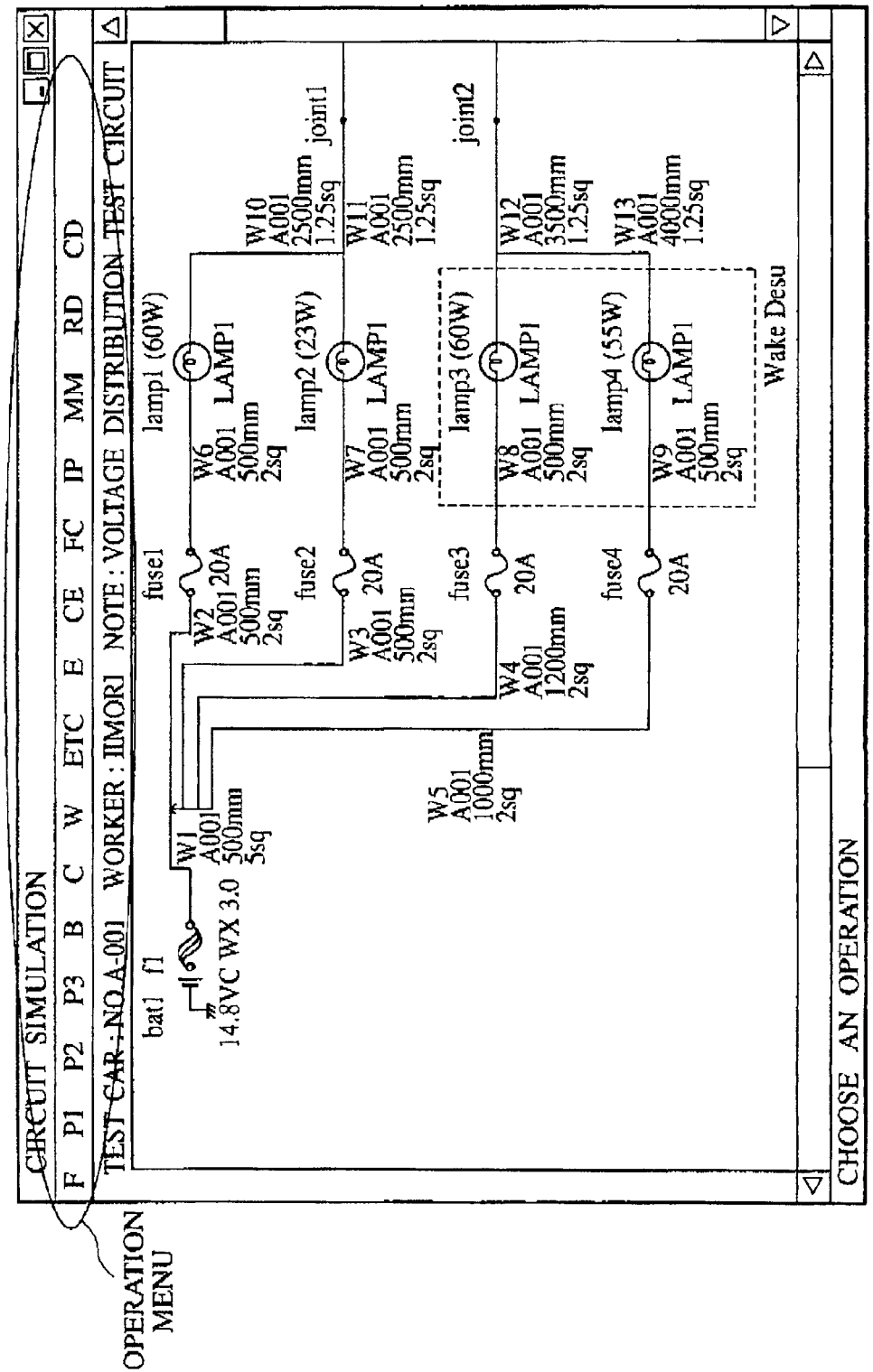
FIG. 8 shows one example of an input screen displaying a test object circuit for the electric wiring simulation device 1 shown in FIG. 2.

The above-described process is repeatedly carried out until the test object circuit is formed (in a step S205) and the test object circuit shown in FIG. 8 is formed. Relays and switches on the test object circuit are changed to thereby set the circuit for making a simulation (in a step S206).

If the formation and setting of the test object circuit are completed as described above, a simulation for a short-circuited test object circuit is started.

Figure 9:
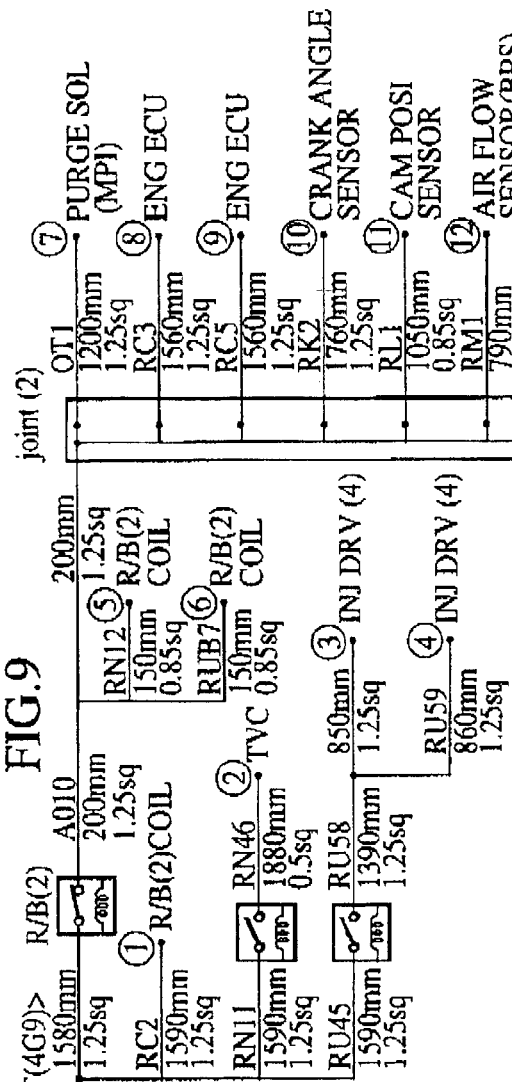
FIG. 9 is an explanatory view for the assignment of a plurality of short-circuit points for the electric wiring simulation device 1 shown in FIG. 2.

A short-circuit part is assigned by clicking on the part to be short-circuited on the test object circuit displayed on the screen (in a step S207). At this time, the operator may input a plurality of short-circuit points in advance to allow the next short-circuit point to be automatically simulated instead of assigning only one short-circuit point. For example, in case of the test object circuit shown in FIG. 9, the operator inputs short-circuit points numbered ①, ②, ③, . . . , automatically assigns the short-circuit points in this order and makes a simulation.

Figure 10:
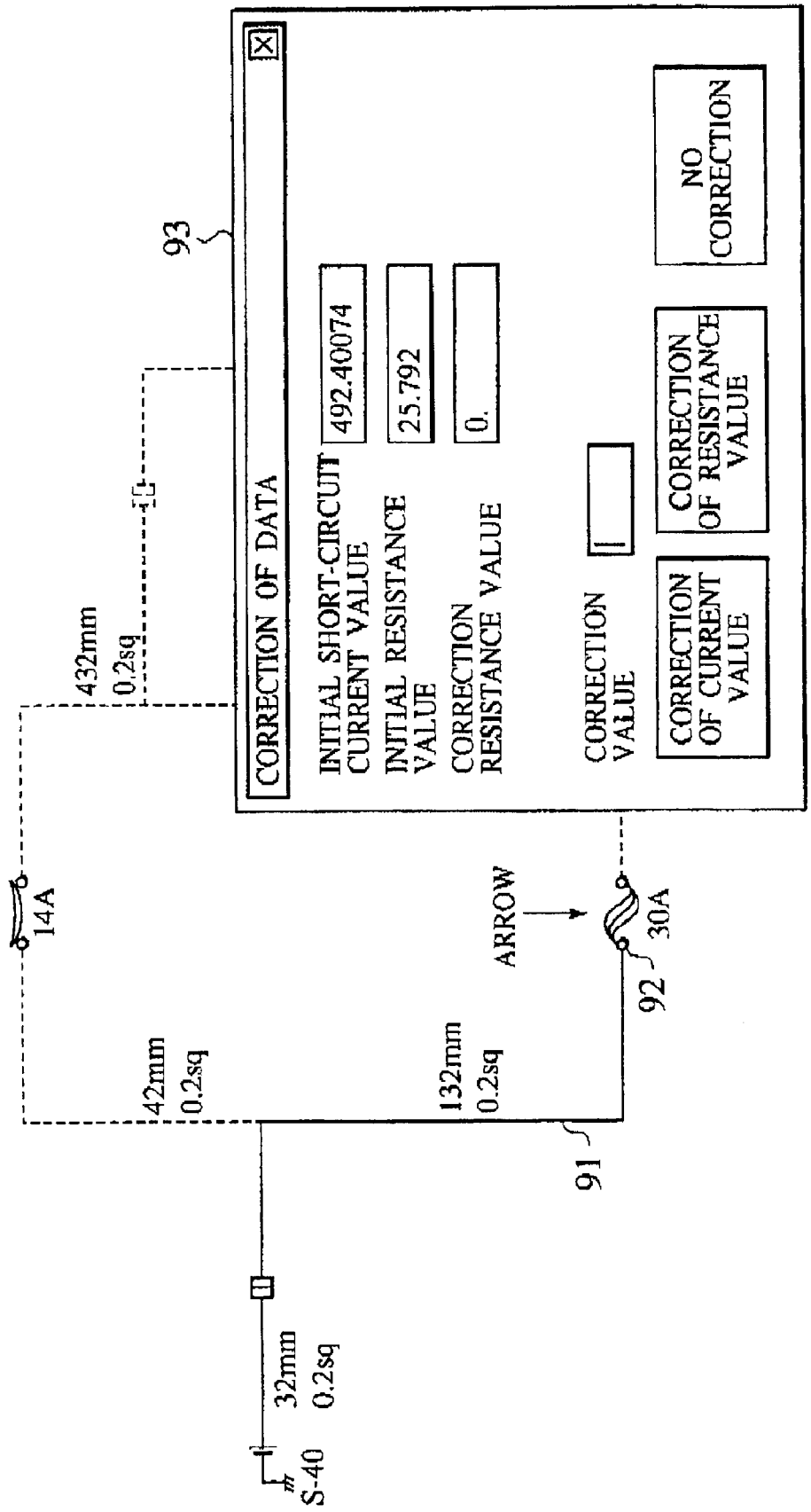
FIG. 10 shows one example of a screen displaying assigned path searching results for the electric wiring simulation device 1 shown in FIG. 2.

When the short-circuit points are assigned as described above, a path between each short-circuit point and the power supply such as a battery is searched. As shown in FIG. 10, the assigned path is assumed as a assigned path 91, displayed on the screen by discriminating the path 91 from the other paths and a short-circuit point 92 is indicated by an arrow (in a step S208).

The initial resistance values of the parts and wirings on the assigned path are read by searching the parts information stored in the characteristics information data base 4 and the initial resistance value of the assigned path is calculated by obtaining the sum of these initial values (in a step S209). The parts information is information including the type, name, current capacity, initial resistance value and the like of each part. By way of example, FIG. 11 shows parts information On the fusible links.

Furthermore, the initial resistance value of the assigned path and the initial short-circuit current value of this assigned path are calculated based on the discharge characteristics of the battery stored in the characteristics information data base 4 (in a step S210). Here, the discharge characteristics of the battery represents the voltage V of the battery after time 1 (sec). The voltage after short circuit time 0 (sec) is read from this discharge characteristics, so that the initial short-circuit current value is calculated from the voltage thus read and the initial resistance value.

The initial resistance value and the initial short-circuit current value thus calculated are displayed on the window 93 shown in FIG. 10. If the corrections of the initial values are necessary, corrected values are inputted on this window 93 to thereby correct the initial values (in a step S211). The initial value corrections are made to conform the values to data in a case where the electric wirings such as wire harnesses are actually mounted on a vehicle. For example, if it is known in advance that the short-circuit current value in the simulation data is lower than a short-circuit current value in a case where the electric wirings are actually mounted on the vehicle, the short-circuit current value in the simulation data is corrected in advance in view of the difference. Likewise, the initial resistance value is corrected.

When the corrections are completed and "No Correction" button is pressed on the window 93 shown in FIG. 10, simulation conditions are set (in a step S212). The conditions to be set include predetermined unit time for repenting the simulation and progress time for executing the simulation. Description will be given herein while assuming that the unit time is set at 0.1 (sec) and the progress time is set at 1800 (sec).

Figure 12:
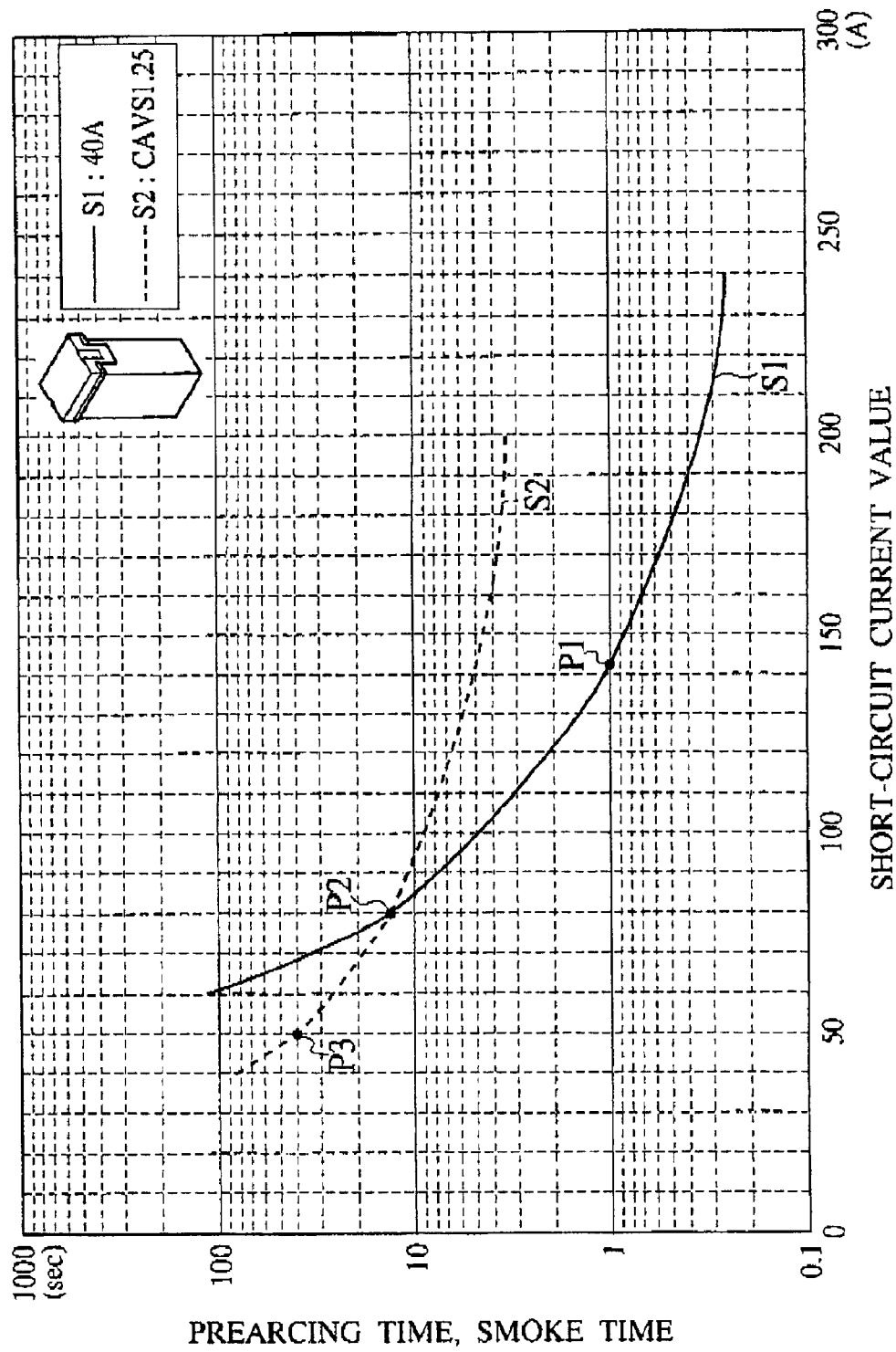
FIG. 12 shows one example of Current-prearcing time characteristics and current-smoke time characteristics stored in the characteristics information data base 4 shown in FIG. 2.

First, it is judged whether or not the protecting parts of the test object circuit are fused in first 0.1 (sec) (in a step S213). Next, it is judged whether or not the wirings of the test object circuit are burned (in a step S214). Here, the judgments as to whether or not the protecting parts are fused and whether or not the wirings are burned are made based on the current-prearcing time characteristics and current-smoke time characteristics stored in the characteristics information data base 4. FIG. 12 shows one example of the current-prearcing time characteristics and the current-smoke time characteristics. The judgment as to whether or not each protecting part is fused and each wiring is burned will be described based on FIG. 12. In FIG. 12, the horizontal axis indicates short-circuit current value and the vertical axis indicates time. A curve S1 indicated by a solid line shows the current-prearcing time characteristics of the protecting part rated 40A, that is, the current-prearcing time is time for the protecting part to be fused with respect to the short-circuit current value. A curve S2 indicated by a dotted line shows the current-smoke time characteristics of the 124-sq wiring, that is, the current-smoke time is time for the wiring to smoke (or to be burned) with respect to the short-circuit current value.

In FIG. 12, for example, after 1 (sec) from the start of the simulation, if the short-circuit Current value exceeds about 142 (A) as indicated by a point PI, the protecting part is fused and if the short-circuit current value is lower than 142 (A), the protecting part is not fused. After a point P2 at which about 15 (sec) is passed from the start of the simulation, the current value with which the wiring smokes is lower than the current value with which the protecting part is fused. As indicated by, for example, a point P3, if the short-circuit current value exceeds 50 (A) after 40 (sec) from the start of the simulation, the wiring is burned.

Figure 13:
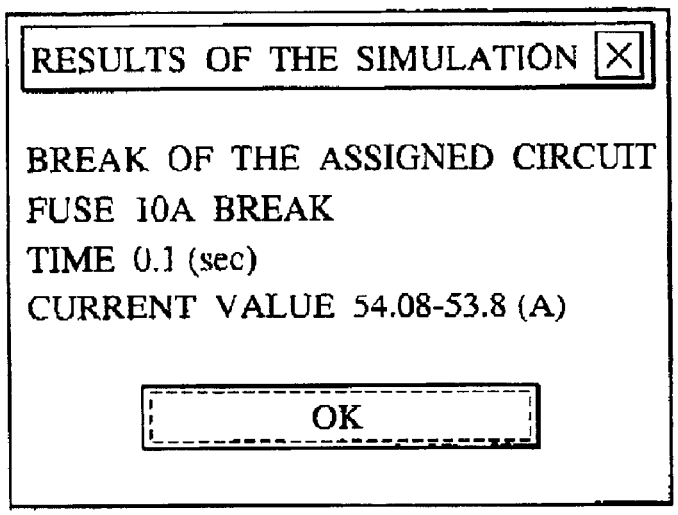
FIG. 13 shows one example of a simulation result display screen if the protecting circuit is fused, for a simulation made by the electric wiring simulation device 1 shown in FIG. 2.
Figure 14:
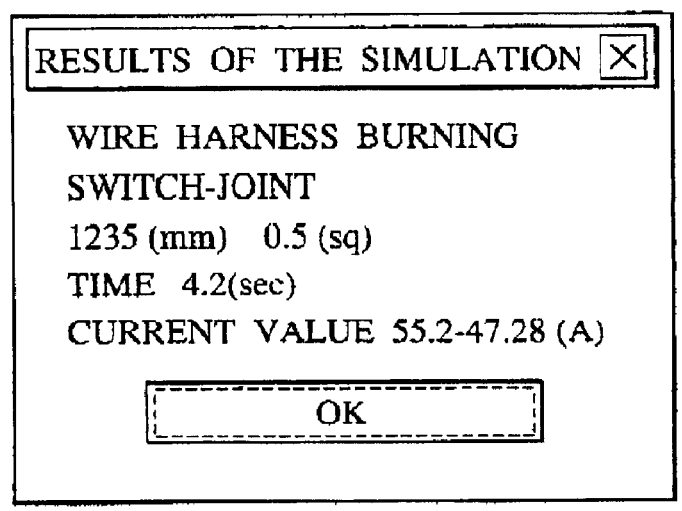
FIG. 14 shows one example of a simulation result display screen if the wiring is burned, for a simulation made by the electric wiring simulation device 1 shown in FIG. 2.

Based on the current-prearcing time characteristics and current-smoke lime characteristics, whether or not the protecting part is fused and whether Or not the wiring is burned are judged. If the protecting part is fused, the results of the simulation are displayed on the display 5 as shown in FIG. 13, and if the wiring is burned, the results of the simulation are displayed on the display 5 as shown in FIG. 14 (in a step S215). The results of simulation include a fused or burned position, time for the protecting part to be fused or time for the wiring to be burned, a current value at that time and the like.

Furthermore, if the protecting part is not fused and the wiring is not burned in the unit time during which the judgments are being made, then it is judged whether or not the progress time satisfies the set time 1800 (sec) (in a step S216).

If the progress time does not satisfy the set time, the short-circuit current value in the next unit time is calculated (in a step S217) and the process after the step S213 is repeated. The short-circuit current value in the next unit time is obtained as follows. A discharge voltage after t (sec) is read from the discharge characteristics of the power supply stored in the characteristics information data base 4. Furthermore, the resistance values of the respective parts and respective wirings after t (sec) are read from the part information. The short-circuit current value is calculated based on the voltage value and the resistance values. The resistance values after t (sec) are calculated in light of a change in respective part and wirings due to the heat emission of the parts and wirings, and the resistance values are stored in the characteristics information data base 4 as parts information.

Figure 15:
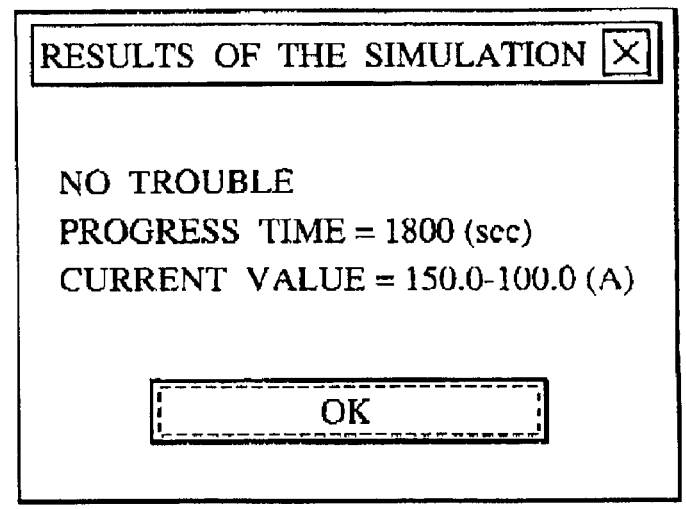
FIG. 15 shows one example of a simulation result display screen if no trouble occurs, for a simulation made by the electric wiring simulation device 1 shown in FIG. 2.

As described above, the short-circuit current value is calculated in view of a change in resistance values if the respective parts and wirings are healed, whereby a simulation in view of a change in resistance values due to the heat emission of the wirings and parts can be made. If the progress time satisfies the set time in the step S216, the results of the simulations are displayed on the display 5 as shown in FIG. 15 (in the step S215) and the simulation is completed.

Figure 16B:
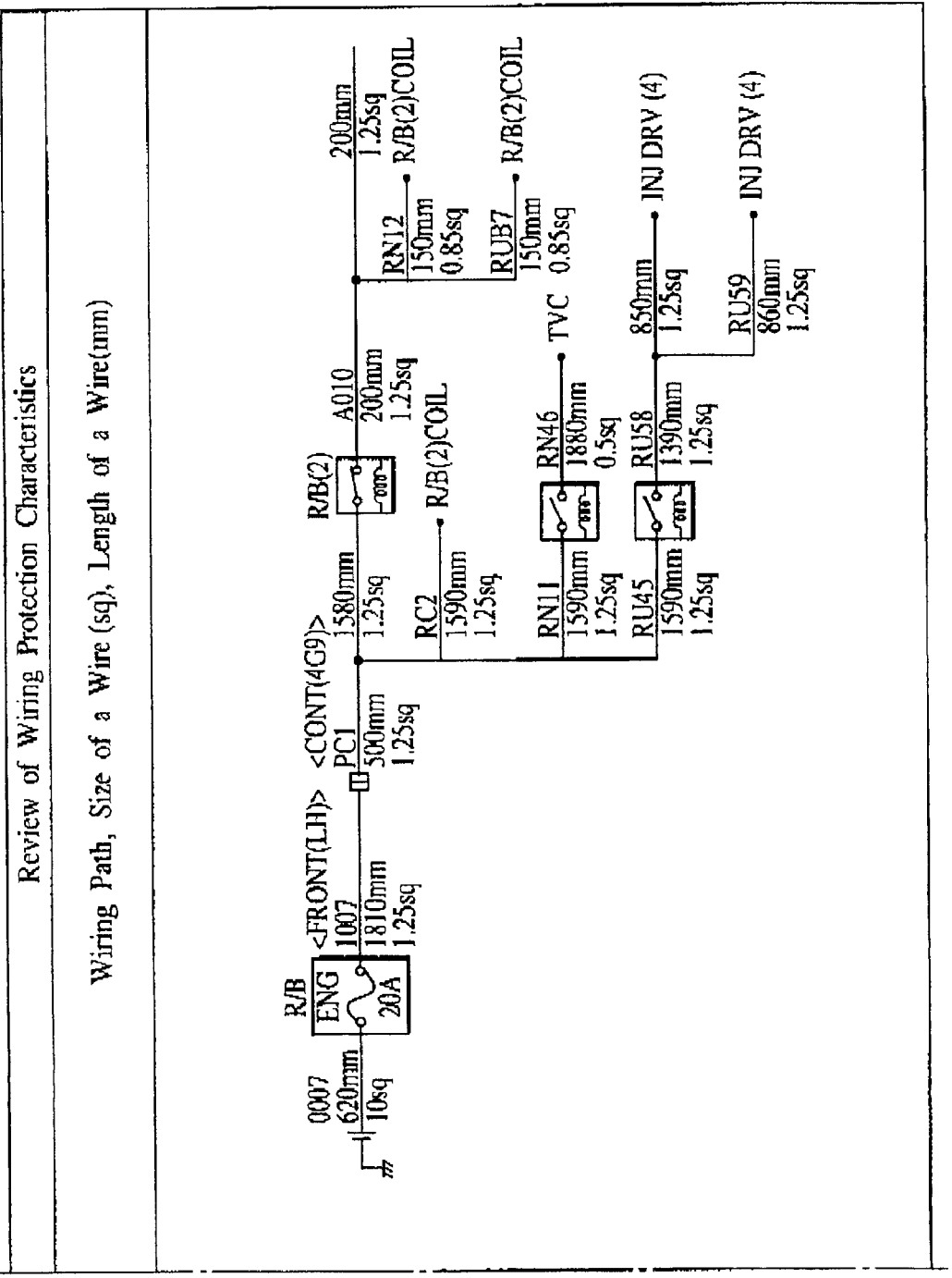
FIG. 16 shows the results of a simulation conducted to a plurality of short-circuit points of the test object circuit.

Furthermore, the similar simulation can be automatically repeated while changing short-circuit points on one test object circuit and the results of these simulations can be collectively outputted in the form of a report as shown in FIG. 16.

According to the electric wiring simulation device 1 in this embodiment, it is possible to make a simulation as to whether or not the protecting parts of the electric wirings are fused and the wirings smoke without the need to actually form a prototype and to conduct a short-circuit test.

It is noted that a program for realizing the respective processing steps of the above-described electric wiring simulation device can be stored in a storage medium. By allowing the computer system to read this storage medium, the program can be executed and the respective processing steps of the above-described electric wiring simulation device can be realized while controlling the computer. The recording medium is exemplified by a device, such as a memory device, a magnetic disk device or an optical disk device, capable of recording the program.

What is claimed is:

1. An electric wiring simulation device simulating characteristics of an electric wiring while the electric wiring is short-circuited, comprising:

a characteristics information data base for storing parts information on parts and wirings constituting a test object circuit, discharge characteristics of a power supply, current-prearcing time characteristics of protecting parts and current-smoke time characteristics of the wirings;

an assigned path searching unit for searching an assigned path between a short-circuit point and the power supply when the short-circuit point on the test object circuit is assigned;

a current value calculating unit for calculating a resistance value on the assigned path searched by the assigned path searching unit, and calculating a short-circuit current value based on the resistance value and the discharge characteristics of the power supply; and a judging unit for judging whether each protecting part on the test object circuit is fused and whether each wiring of the assigned path smokes based on the short-circuit current value calculated by the current value calculating unit, the current-smoke time characteristics and the current-prearcing time characteristics, at unit time intervals.

2. An electric wiring simulation device according to claim 1, wherein the current value calculating unit takes account of the resistance value during heat emission based on a change in the resistance values with respect to time, the resistance values included in the parts information.

3. A recording medium for recording a simulation program for an electric wiring simulation device simulating characteristics of an electric wiring while the electric wiring is short-circuited, the simulation program recorded on the recording medium comprising:

a storage process for storing parts information on parts and wirings constituting a test object circuit inputted as a simulation object, discharge characteristics of a power supply, current-prearcing time characteristics of protecting parts and current-smoking time characteristics of the wirings, in a data base;

an assigned path searching process for searching an assigned path between a short-circuit point and the power supply when the short-circuit point is assigned on the test object circuit;

a current value calculating process for calculating a resistance value on the assigned path searched in the assigned path searching process, and for calculating a short-circuit current value based on the resistance value and the discharge characteristics of the power supply; and a judging process for judging whether each protecting part on the assigned path is fused and whether each wiring on the assigned path smokes based on the short-circuit current value calculated in the current value calculating process the current-smoke time characteristics and the current-prearcing time characteristics, at unit time intervals.

4. A recording medium for recording a simulation program for an electric wiring simulation device simulating characteristics of an electric wiring according to claim 3, wherein the current value calculating process is conducted while taking account of the resistance value during heat emission based on a change in the resistance values with respect to time, the resistance values included in the parts information.

5. A computer readable medium containing computer code for performing a simulation program for an electric wiring simulation device simulating characteristics of an electric wiring while the electric wiring is short-circuited, the computer code for performing a simulation program comprising:

a storage code segment for storing parts information on parts and wirings constituting a test object circuit inputted as a simulation object, discharge characteristics of a power supply, current-prearcing time characteristics of protecting parts and current-smoking time characteristics of the wirings, in a data base;

an assigned path searching code segment for searching an assigned path between a short-circuit point and the power supply when the short-circuit point is assigned on the test object circuit;

a current value calculating code segment for calculating a resistance value on the assigned path searched in the assigned path searching code segment, and for calculating a short-circuit current value based on the resistance value and the discharge characteristics of the power supply; and a judging code segment for judging whether each protecting part on the assigned path is fused and whether each wiring on the assigned path smokes based on the short-circuit current value calculated in the current value calculating code segment, the current-smoke time characteristics and the current-prearcing time characteristics, at unit time intervals.

6. A computer readable medium containing computer code for performing a simulation program for an electric wiring simulation device simulating characteristics of an electric wiring while the electric wiring is short-circuited according to claim 5, wherein the current value calculating code segment is conducted while taking account of the resistance value during heat emission based on a change in the resistance values with respect to time, the resistance values included in the parts information.

* * * * *

UNITED STATES PATENT AND TRADEMARK OFFICE
CERTIFICATE OF CORRECTION

PATENT NO. : 6,925,429 B2
DATED : August 2, 2005
INVENTOR(S) : Yasuo Iimori

It is certified that error appears in the above-identified patent and that said Letters Patent is hereby corrected as shown below:

Title page,
Item [57], ABSTRACT,
Line 13, "nor" should read -- not --.
Line 14, "etch" should read -- each --.

Column 8,
Line 62, "process the" should read -- process, the --.

Signed and Sealed this

Tenth Day of January, 2006

JON W. DUDAS
*Director of the United States Patent and Trademark Office*